(12) United States Patent
Matsushita (10) Patent No.: US 6,813,036 B1
(45) Date of Patent: Nov. 2, 2004

(54) INTERNET FACSIMILE MACHINE

(75) Inventor: Satoshi Matsushita, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/239,144

(22) Filed: Jan. 28, 1999

(30) Foreign Application Priority Data

Jan. 29, 1998 (JP) ............................................ 10-033944
Jan. 29, 1998 (JP) ............................................ 10-033945

(51) Int. Cl.$^7$ ....................... G06F 15/00; H04M 11/00
(52) U.S. Cl. ................... 358/1.15; 358/440; 379/93.23; 709/206
(58) Field of Search ............................... 358/1.15, 402, 358/403, 407, 440, 444, 468, 442; 709/238, 239, 240, 206, 219; 379/100.01, 100.08, 100.09, 100.11, 93.23, 93.24, 100.14

(56) References Cited

U.S. PATENT DOCUMENTS

| | | | | |
|---|---|---|---|---|
| 5,146,348 A | * | 9/1992 | Kenneyama ................. | 358/407 |
| 5,189,523 A | * | 2/1993 | Sugiura et al. ............. | 358/300 |
| 5,381,527 A | * | 1/1995 | Inniss et al. ................ | 395/200 |
| 5,790,803 A | * | 8/1998 | Kinoshita et al. ........... | 709/245 |
| 5,859,967 A | * | 1/1999 | Kaufeld et al. ............. | 395/186 |
| 5,862,202 A | * | 1/1999 | Bashoura et al. ........... | 379/100.14 |
| 5,872,845 A | * | 2/1999 | Feder .......................... | 358/442 |
| 5,923,848 A | * | 7/1999 | Goodhand et al. .......... | 709/219 |
| 5,974,449 A | * | 10/1999 | Chang et al. ................ | 709/206 |
| 5,991,291 A | * | 11/1999 | Asai et al. ................... | 370/352 |
| 6,023,345 A | * | 2/2000 | Bloomfield .................. | 358/402 |
| 6,025,931 A | * | 2/2000 | Bloomfield .................. | 358/402 |
| 6,141,695 A | * | 10/2000 | Sekiguchi et al. .......... | 709/246 |
| 6,157,706 A | * | 12/2000 | Rachelson ................... | 379/100 |
| 6,208,426 B1 | * | 3/2001 | Saito et al. ................. | 358/1.15 |
| 6,347,085 B2 | * | 2/2002 | Kelly .......................... | 370/352 |

FOREIGN PATENT DOCUMENTS

| | | |
|---|---|---|
| JP | A-6-14053 | 1/1994 |
| JP | A-9-171491 | 6/1997 |
| JP | A-9-200256 | 7/1997 |
| JP | A-9-247335 | 9/1997 |
| JP | A-9-288634 | 11/1997 |
| WO | WO 97/10668 | * 3/1997 |

* cited by examiner

Primary Examiner—Edward Coles
Assistant Examiner—Joseph R Pokrzywa
(74) Attorney, Agent, or Firm—Oliff & Berridge PLC (57) ABSTRACT

An internet facsimile machine capable of facsimile transmission via an internet to an addressee includes an identification information input circuit for inputting user identification information of an address of an addressee, a predetermined information input/selection circuit for inputting or selecting a predetermined piece of information so that information relating to a user in the address of the addressee is narrowed, a storage unit for storing a large amount of information about the user, a candidate presenting circuit for presenting a candidate for information relating to the user in the address of the addressee by relating the predetermined information input or selected by the input/selection circuit to the information about the user stored in the storage unit, a presented candidate determining circuit for determining only one candidate when said one candidate is presented by the candidate presenting circuit, and for selecting and determining either or any one of two or more candidates when said two or more candidates are presented by the candidate presenting circuit, and a transmission instruction circuit for instructing execution of internet transmission according to an address determined by the identification information input circuit and the presented candidate determining circuit.

13 Claims, 9 Drawing Sheets

INTERNET FACSIMILE MACHINE

BACKGROUND OF THE INVENTION

1. Field of the Invention

This invention relates to an internet facsimile machine capable of facsimile transmission via an internet to an addressee.

2. Description of the Related Art

In transmitting an electronic mail via an internet, data of the same information as has been transmitted is usually stored in a memory of a personal computer etc. of an addresser. On the other hand, when information to be transmitted is once sent to a relay domain such as a commercial provider using an internet facsimile machine, the information is not usually preserved or stored in the internet facsimile machine whether or not the information has actually reached an addressee. The reason for this is that the information transmitted by the internet facsimile machine is image information which generally contains a large amount of information.

Accordingly, when an transmitting operation is carried out in the internet facsimile machine with an erroneous addressee being designated, the transmitting operation including reading image information by a scanner needs to be re-carried out in order that the image information may be transmitted to a correct addressee. Thus, the re-transmitting operation is more troublesome in the internet facsimile transmission than in the electronic mail transmission via the internet. In view of the above-described troublesomeness, preventing errors in input of an address is particularly desired in the internet facsimile machine. However, in the input of an address, characters indicative of each of user identification information and the name of domain of the address are input one by one. The address input is thus troublesome and apt to cause errors.

SUMMARY OF THE INVENTION

Therefore, an object of the present invention is to provide an internet facsimile machine in which operability can be improved in input of an address and errors caused in input of an address of the addressee can be reduced.

The present invention provides an internet facsimile machine capable of facsimile transmission via an internet to an addressee, comprising identification information input means for inputting user identification information of an address of an addressee, the address including user identification information and information relating to a user, attribute presenting means for presenting the plurality of attributes of the information relating to the user so that one of the presented plurality of attributes is selected, and predetermined information input/selection means for inputting or selecting a predetermined piece of information so that information relating to a user in the address of the addressee is narrowed. Storage means is provided for storing a large amount of information about the user. Candidate presenting means is provided for presenting a candidate for information relating to the user in the address of the addressee by relating the predetermined information input or selected by the input/selection means to the information about the user stored in the storage means. Presented candidate determining means is provided for determining only one candidate when said one candidate is presented by the candidate presenting means, and for selecting and determining either or any one of two or more candidates when said two or more candidates are presented by the candidate presenting means. Transmission instruction means is provided for instruction execution of internet transmission according to an address including the user identification information input by the identification information input means and the information relating to the user determined by the presented candidate determining means.

The above-described internet facsimile machine relies on the following fact. An amount of information about the user contained in the address of the addressee (for example, the number of existing domain names) is much smaller as compared with an amount of the personal identification information (such as the ID number) contained in the address of the addressee. Accordingly, the existing domain names can previously be stored in the internet facsimile machine side so as to correspond to respective pieces of related information. An arrangement can be provided for calling a desired one of the stored domain names by an easy operation.

More specifically, the predetermined information input/selection means inputs or selects a predetermined piece of information so that information relating to a user in the address of the addressee is narrowed. The candidate presenting means presents a candidate for information relating to the user of the address of the addressee by relating the predetermined information input or selected by the input/selection means to the information about the user stored in the storage means. Presented candidate determining means determines only one candidate when said one candidate is presented by the candidate presenting means, and for selecting and determining either or any one of two or more candidates when said two or more candidates are presented by the candidate presenting means. Transmission instruction means is provided for instructing execution of internet transmission according to an address determined by the identification information input means and the presented candidate determining means. The transmission instruction means instructs the execution of internet transmission according to an address determined including, for example, characters and numerals, by the identification information input means and the presented candidate determining means. In this arrangement, the information relating to the user preferably includes a name of domain.

In a preferred form, the predetermined information input/selection means includes character/numeral input means capable of inputting characters and numerals one by one. The character/numeral input means also serves as the predetermined information input/selection means. Further, the predetermined information input or selected by the predetermined information input/selection means includes one or more characters or numerals at a predetermined location of the domain name. Additionally, the candidate presenting means presents a candidate for domain name at a location corresponding to the predetermined location where the same character or numeral as the character or numeral input or selected by the predetermined information input/selection means.

In another preferred form, the internet facsimile machine further comprises a registration key for registering a candidate for at least any one of the whole address of the addressee, personal identification information of the address, and information in the address relating to the user, registration storage means for storing the candidate registered by the registration key, calling means for calling any one of the candidates stored in the registration storage means, and called candidate determining means, when the candidates called by the calling means includes a desired one, for selecting and determining the desired candidate. In this arrangement, the transmission instruction means is preferably capable of instructing execution of transmission with respect to an address which is the candidate determined by the called candidate determining means or an address including the candidate determined by the called candidate determining means.

In further another preferred form, the internet facsimile machine further comprises inquiry means for inquiring of a domain name server on the internet about the presence of a domain name of an addressee's address input by the operator before execution of internet facsimile transmission, inquiry transmission instruction means for instructing execution of internet facsimile transmission to the addressee's address including the domain name when informed of presence of the domain name as the result of inquiry by the inquiry means, and notification means for notifying the operator of absence of the domain name when informed of absence of the domain name as the result of inquiry by the inquiry means.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
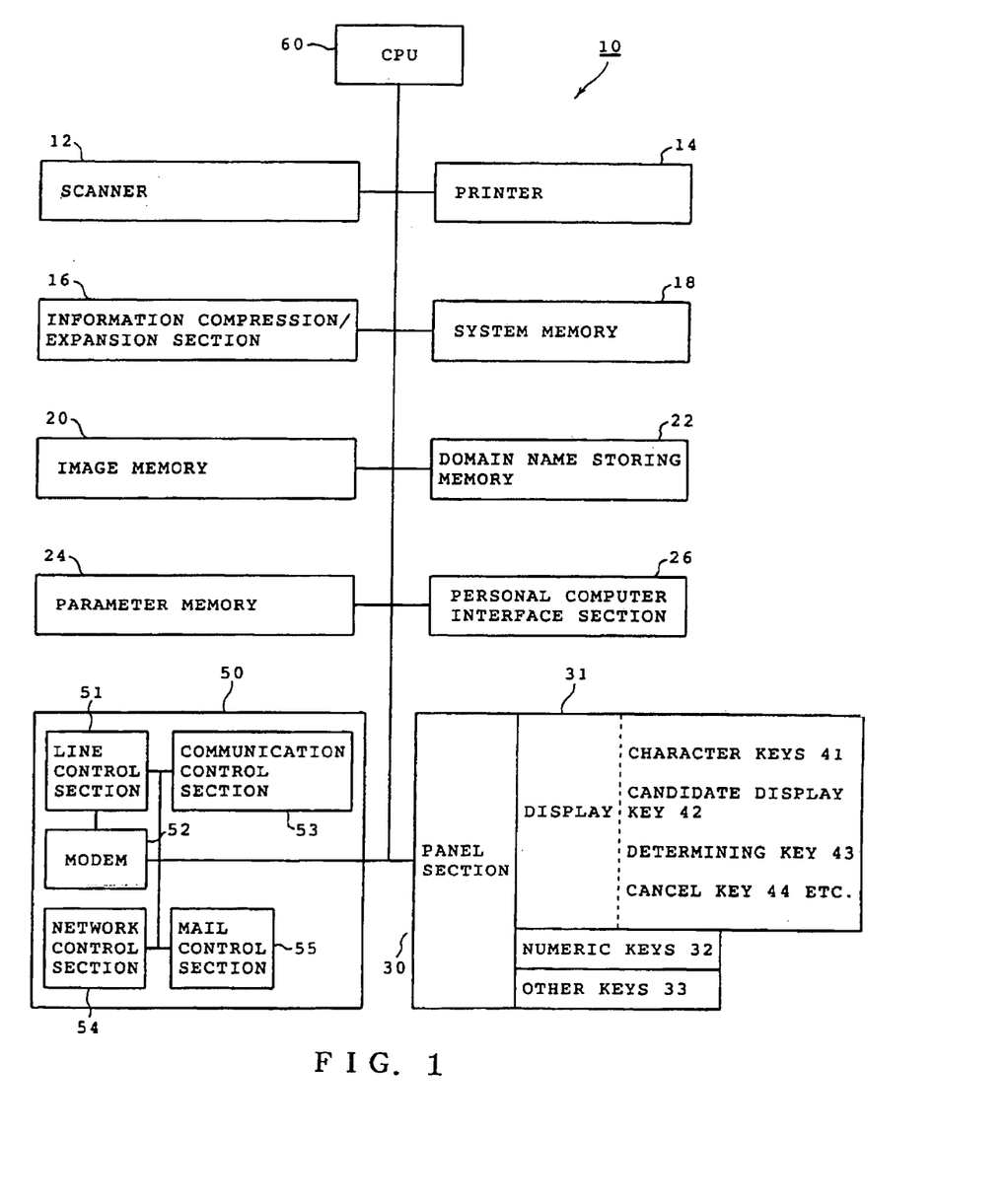
FIG. 1 is a schematic block diagram of an internet facsimile machine of a first embodiment in accordance with the present invention.

A first embodiment of the present invention will be described in detail with reference to FIGS. 1 to 3. Referring to FIG. 1, the arrangement of an internet facsimile machine of the first embodiment is schematically shown. The internet facsimile machine 10 comprises a CPU 60, a scanner 12, a printer 14, an information compression/expansion section 16, a system memory 18, an image memory 20, a domain name storing memory 22, a parameter memory 24, a personal computer interface section 26, a panel section 30, and a communication facility section 50.

The scanner 12 scans an original document etc. to read images including characters, numerals, etc. The printer 14 is provided for printing images on printing paper. The information compression/expansion section 16 compresses image information read by the scanner 12 for the purpose of transmission and expands received image information. The system memory 18 stores a control program for controlling the machine 10 and various pieces of information necessary for execution of the control program. The image memory 20 stores the image information compressed by the information compression/expansion section 16.

The domain name storing memory 22 stores character groups indicative of domain names of a large number of domestic and foreign servers on an internet. The character groups are related to pieces of predetermined information such as attributes of the domains or part of the characters indicative of the respective domain names respectively. The domain name is a piece of information relating to a user. The domain name storing memory 22 is capable of additionally storing the domain names in relation to the pieces of predetermined information depending on the users, respectively. The domain name storing memory 22 constitutes storage means and registration storage means in the invention. The parameter memory 24 stores information specific to the machine 10 including information about the results of communication and information about addressees. The personal computer interface section 26 is provided for accomplishing exchange of information between the machine 10 and a personal computer.

The panel section 30 comprises a display 31, numeric keys 32 and other keys 33. The display 31 displays various pieces of information and also displays various types of keyboard screens. When an operator touches the keyboard screen, an item corresponding to the touched part of the screen is input. For example, character keys 41, a candidate display key 42, a determining key 43, and a cancel key 45 are diagrammatically displayed on the display 31. The candidate display key 42 is operated so that candidates are displayed. The determining key 43 is provided for selecting and determining one of the displayed candidates. The cancel key 45 is provided for canceling a process which has been executed. The panel section 30 and the CPU 60 constitute identification information input means, character/numeral input means, candidate presenting means, presented candidate determining means, calling means, and called candidate determining means in the invention.

The communication facility section 50 comprises a line control section 51, a modem 52, a communication control section 53, a network control section 54 and a mail control section 55, as well known in the art. The line control section 51 controls a communication line. The modem 52 modulates and demodulates signals. The communication control section 53 controls communication via the line control section 51 and the modem 52. The network control section 54 controls communication between the machine 10 and a LAN. The mail control section 55 controls processes for adding a mail as a header of image information and the like. The communication facility section 50 and the CPU 60 constitute transmission instruction means in the invention.

Figure 2:
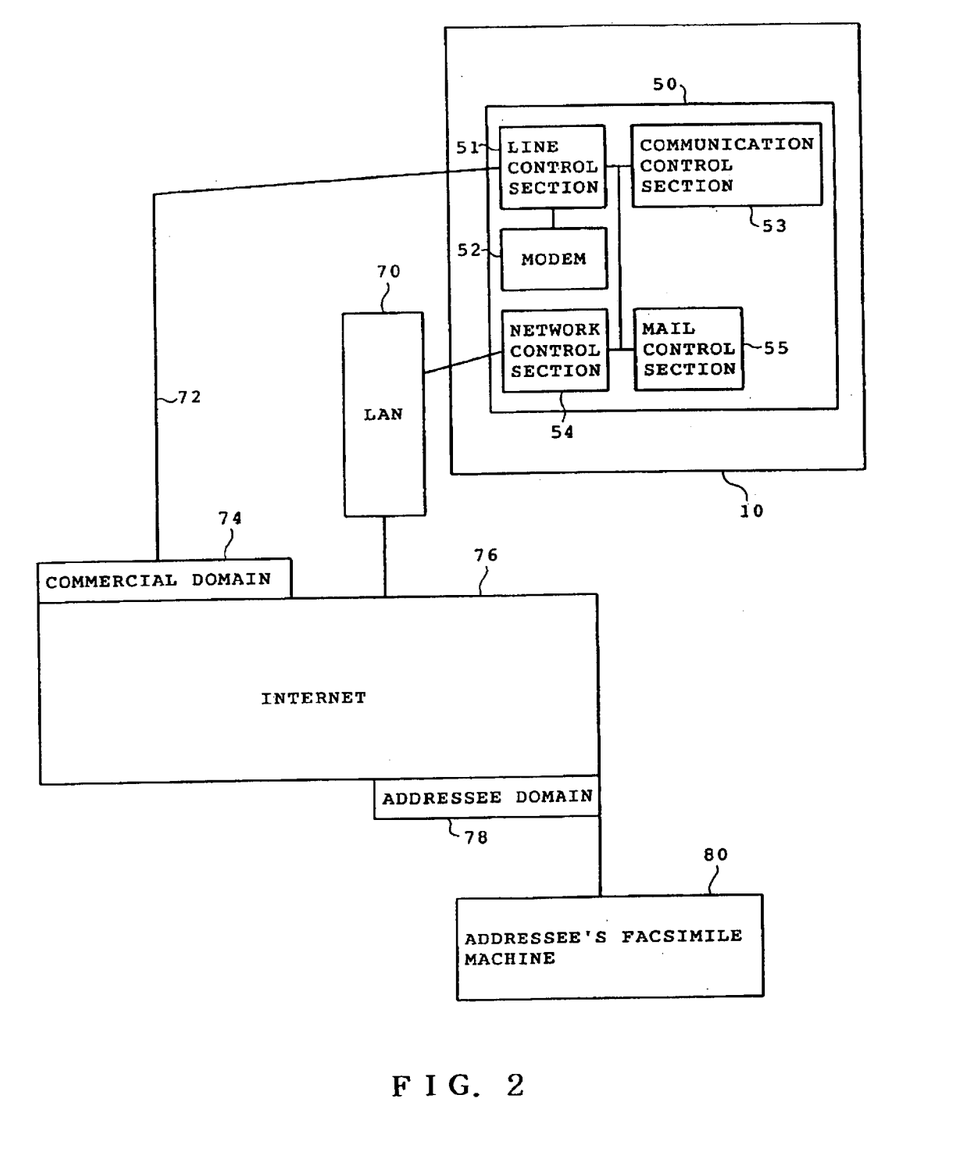
FIG. 2 is a schematic block diagram of the internet facsimile machine and a communication network connected to the internet facsimile machine.
Figure 3:
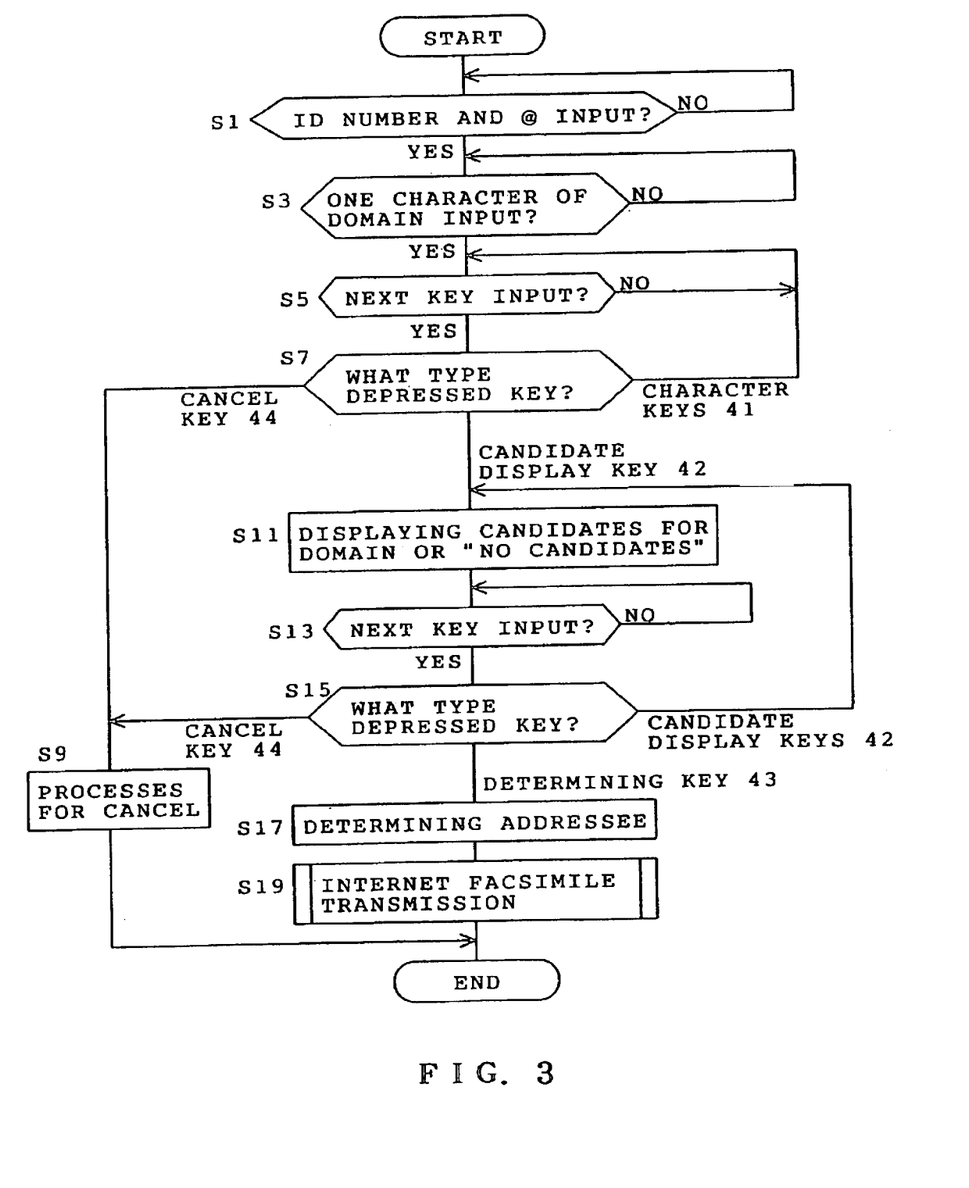
FIG. 3 is a flowchart showing an example of processing for transmission.

FIG. 2 schematically shows the internet facsimile machine 10 and a communication network connected thereto. The network control section 54 of the communication facility section 50 is connected to a LAN 70, whereas the line control section 51 of the communication facility section 50 is connected to a public telephone line 72. The telephone line 72 is connected via a commercial domain (provider) 74, an internet 76 and an addressee domain 78 to a facsimile machine 80 of an addressee. The LAN 70 is connected via the internet 76 and the addressee domain 78 to the facsimile machine 80 of the addressee.

Processes for transmission by use of the internet facsimile machine 10 will be described with reference to FIG. 3. The CPU 60 judges whether an ID number serving as user identification information of an addressee and the symbol @ have continuously been input with the numeric keys 32 and character keys 41 (step S1). It is assumed that the other information necessary for the transmission has already been input. When the ID number and the symbol @ have not been input yet (NO at step S1), the CPU 60 is on standby for input of these pieces of information. When the ID number and the symbol @ have been input (YES at step S1), the CPU 60 judges whether a first character of a domain name of the addressee or a numeral has been input with the character key 41 (step S3). When the character has not been input yet (NO at step S3), the CPU 60 is on standby for input of the character.

On the other hand, when the character has been input (YES at step S3), the CPU 60 is on standby for a next input with another key (NO at step S5). When the next input has been supplied (YES at step S5), the CPU 60 judges what key has been depressed, the candidate display key 42 for displaying a candidate for the domain name on the display 31, the character key 41 for input of any character or the cancel key 44 canceling the hitherto executed processes due to erroneous input of the first character of the domain name (step S1).

When judging at step S7 that the cancel key 44 has been depressed, the CPU 60 cancels the hitherto executed processes (step S9), ending the processes for transmission. Further, when any character key 41 has been depressed at step S7, the CPU 60 returns to the process at step S5. When the candidate display key 42 has been depressed at step 55, the CPU 60 retrieves one or more candidates for the domain name including the first character or characters (for example, "a" or "ab") input with the character key 41 in data of a large number of domain names stored in the domain name storing memory 22. The CPU 60 displays the retrieved one or more candidates on the display 31 or the information of "No candida" when no candidates for the domain name have been found (step S11). In this case, when the candidates for the domain name cannot be displayed on one screen of the display 31, the screen may be scrolled or the pages are turned over so that all the candidates are displayed. Thereafter, the CPU 60 is on standby for re-entry with a key (NO at step S13). When a key input has occurred (YES at step S13), the CPU 60 judges what key has been depressed, the candidate display key 42, the determining key 43 or the cancel key 44 (step S15). When the candidate display key 42 has been depressed, one or more candidates for the domain name including the first character or characters hitherto input with the character keys 41 are displayed (step S1). Alternatively, the information, "No other candidates" is displayed.

Further, when the determining key 43 for selecting and determining a desired one of the displayed candidates at step S15, the CPU 60 judges that the determined domain name is the domain name of the addressee, determining an address of the addressee on the basis of the specified ID number and the selected domain name (step S17). Thereafter, the CPU 60 carries out processes for the internet facsimile transmission to the facsimile machine 80 of the addressee (step S19). More specifically, data of information to be transmitted is first read by the scanner 12 at step S19. The read data is then compressed by the information compression/expansion section 16. A format conversion is then carried out for the purpose of transmission of the compressed data of information onto the internet 76. Further, necessary information such as the addressee is added to the information to be transmitted. The modem 52 and the line control section 51 carry out internet facsimile transmission via the commercial domain 74 to the domain 78 and accordingly to the addressee's facsimile machine 80.

On the other hand, when judging at step S15 that the cancel key 44 has been depressed since the candidates for the domain include no corresponding domain or for other reasons, the CPU 60 carries out processes for cancel (step S9), ending the processes for transmission. In this case, the address can be input by inputting the characters indicative of the domain name one by one.

According to the foregoing embodiment, when some first characters of the domain name of the addressee's address are input, the candidates for the domain name including the input characters are displayed. A desired one of the candidates can be selected. In other words, when first one or two characters of the domain name are input, the other characters of the domain name can be complemented. Accordingly, an erroneous input of the address can be prevented. Of course, after first three or four characters of the domain name have been input, the subsequent characters thereof may be complemented. Alternatively, after any suitable character or characters except the first one have been input, the other characters may be complemented.

Figure 4:
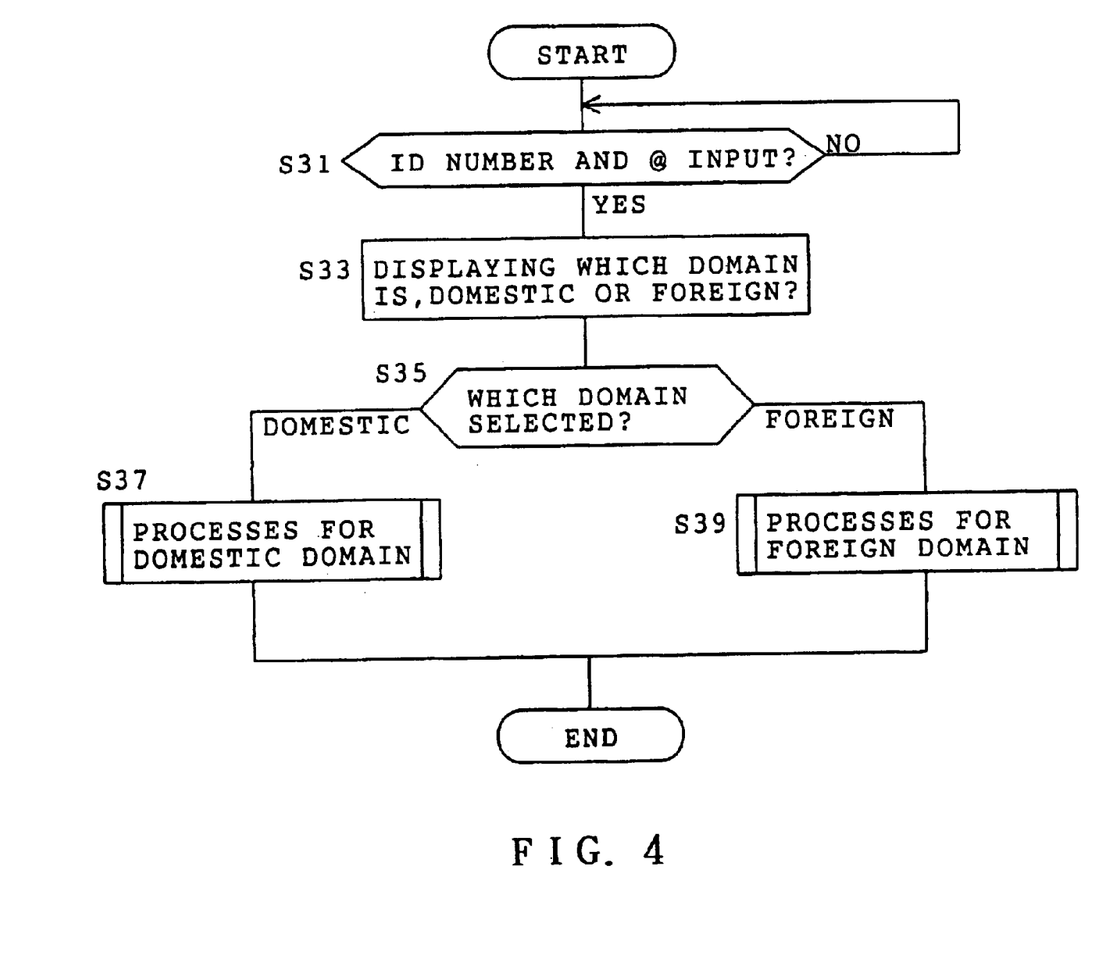
FIG. 4 is a flowchart showing part of the transmission processing in an internet facsimile machine of a second embodiment in accordance with the present invention.

FIGS. 4 to 6 illustrate a second embodiment of the invention. In the second embodiment, the CPU 60 judges, at step S31 in FIG. 4, whether the ID number of the addressee and the symbol @ have continuously been input with the numeric keys 32 and character keys 41. The CPU 60 is on standby for input of these pieces of information when the ID number and the symbol @ have not been input yet (NO at step S31). When the ID number and the symbol @ have been input, the CPU 60 displays on the display 31 character strings, "Domestic" and "Foreign" together with an message, depress "Domestic" when the domain name is domestic or depress "Foreign" when the domain name is foreign (step S33).

The CPU 60 then judges which the domain name is, domestic or foreign, on the basis of the character string depressed or touched by the operator (step 535). When the domain name is domestic, the CPU 60 carries out processes for the domestic domain name (step S37). On the other hand, when the domain name is foreign, the CPU 60 carries out processes for the foreign domain name (step S39).

Figure 5:
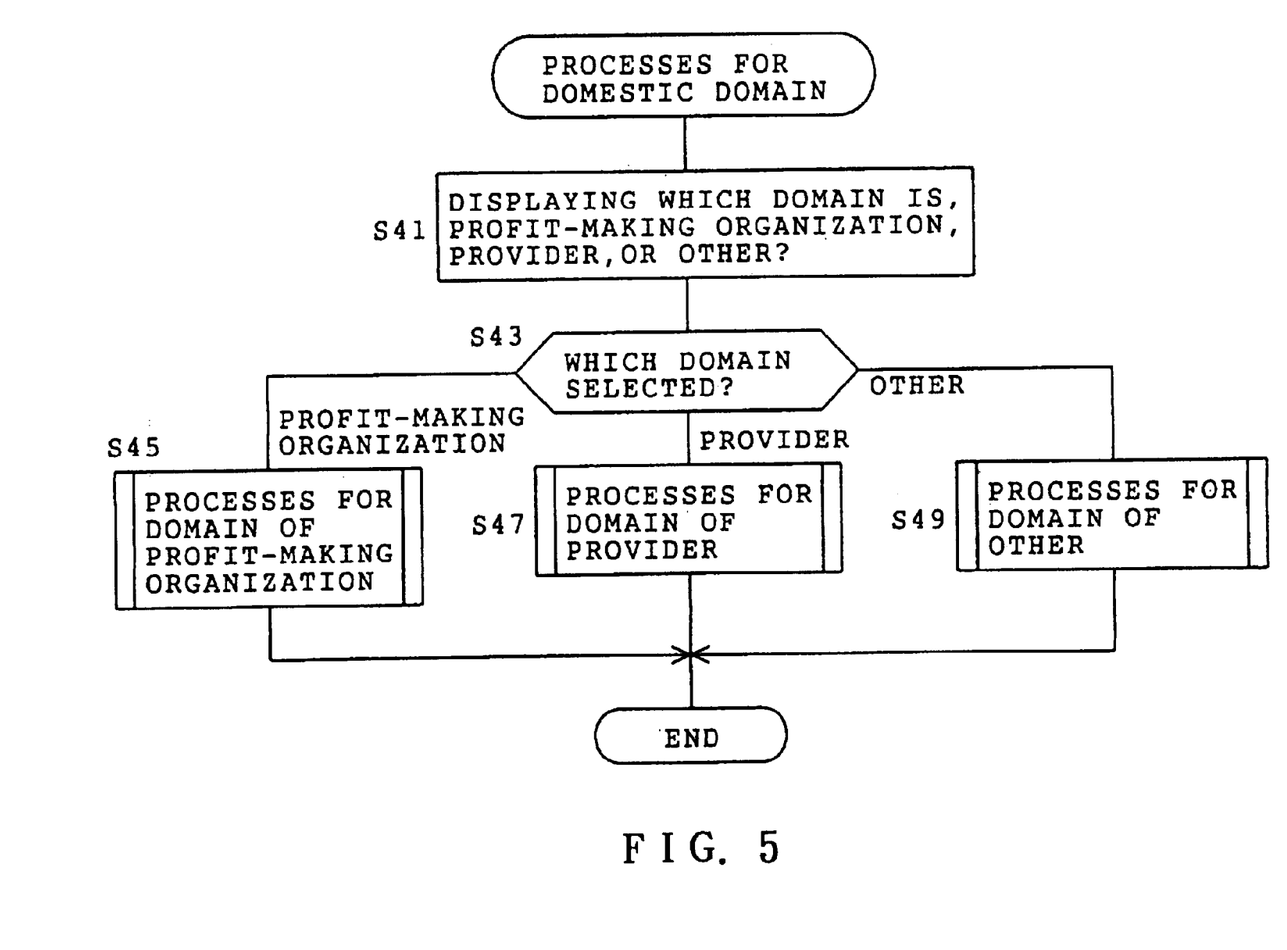
FIG. 5 is a flowchart showing processes in detail when the transmission is directed to a domestic domain, in the processing shown in FIG. 4.

FIG. 5 shows the processes for the domestic domain name in detail. First, the CPU 60 displays on the display 31 "Profit-making organization," "Provider" and "Another" with a message, "Depress "profit-making organization" when the domain is a profit-making organization such as a corporation," "Depress "provider" when the domain is a commercial domain (provider)," and "Depress "Another" when the domain is another" (step S41). The CPU 60 then judges the type of the selected domain name on the basis of the depressed or touched character string (step S43), thereby narrowing the candidate for the domain name. For example, when the domain name is a profit-making organization, the CPU 60 carries out processes for the domain of profit-making organization (step S45) as will be described hereinafter.

Figure 6:
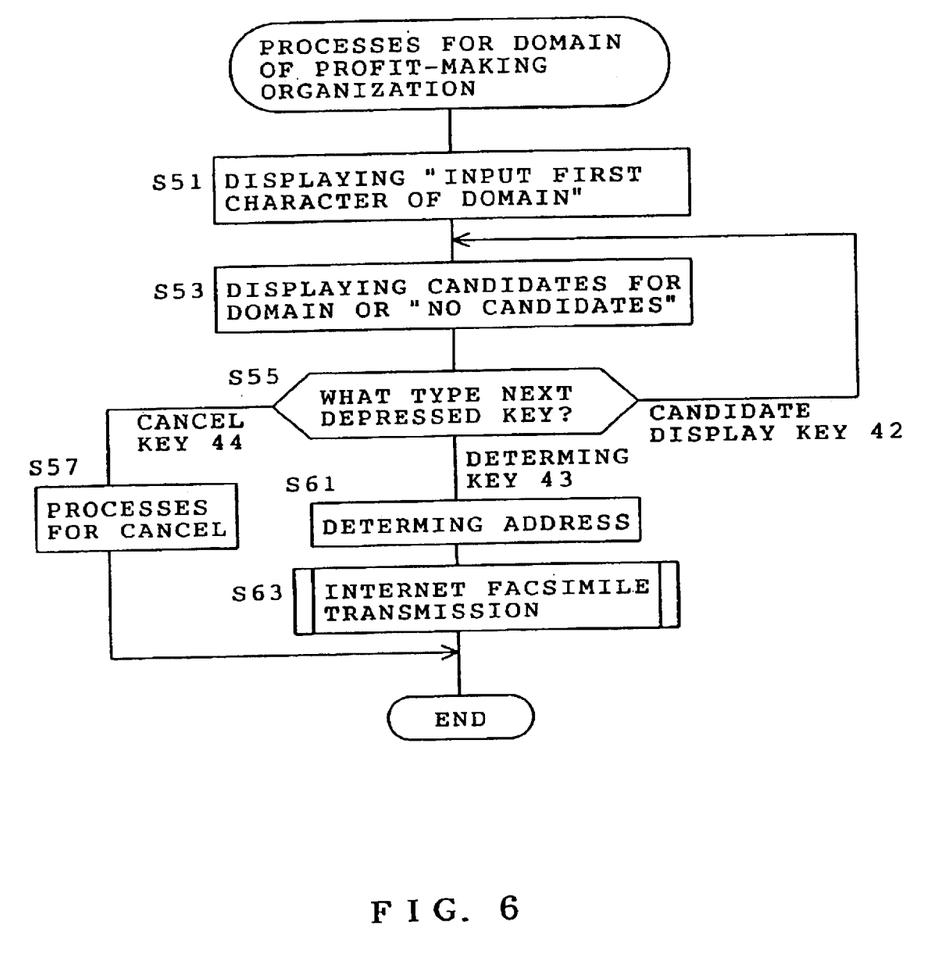
FIG. 6 is a flowchart showing processes in detail when the transmission is directed to a profit-making organization in the processing for the domestic domain shown in FIG. 5.

FIG. 6 shows the processes for the domain of profit-making organization. First, the CPU 60 displays on the display 31 a message, "Input a first character of the domain name." (step S51). Then, based on an attribute of the domain name ("domain of domestic profit-making organization" in the embodiment) and the input first character of the domain, the CPU 60 displays on the display 31 some candidates for the domain or a message, "No candidates" (step S53). The CPU 60 then judges what key has been depressed, the cancel key 44, the determining key 43 or the candidate display key 42 (step S55).

When the cancel key 44 has been depressed, the CPU 60 cancels the hitherto executed processes (step S57), ending the processes for transmission. Further, when judging at step S55 that the candidate display key 42 has been depressed, the CPU 60 returns to the process at step S53, so that other candidates for the domain name or the message, "No candidates" is displayed. Further, when judging at step S55 that the determining key 43 has been depressed, the CPU 60 determines the address of the addressee based on the already specified ID number and the domain name determined as described above (step S61). The CPU 60 then carries out the processes for transmission to the addressee (step S63), which processes are the same as those at step S19 in FIG. 3 in the first embodiment.

On the other hand, the domain selected at step S43 in FIG. 5 is a provider or another, processes for the provider (step S47) or processes for another domain (step S49) is carried out. Since these processes at steps S47 and S49 are set to correspond to the processes for the profit-making organization domain at step S45, the detailed description of these processes will be eliminated. Further, the processes for the foreign domain at step S39 in FIG. 4 is also set to correspond to the processes for the domestic domain at step S37, the description of the processes will be eliminated.

According to the second embodiment, the candidates for the domain name can be narrowed with the attribute of the domain name being added. Consequently, the domain name desired by the operator can be selected reliably and quickly.

In the foregoing embodiments, after one or more characters composing the domain name have been input, the other characters of the domain name are complemented. However, for example, a plurality of attributes of the domain name may sequentially be selected so that the candidates therefor are narrowed and the domain name is selected, instead.

Further, one or more domain names the operator frequently uses may be stored in a predetermined storage area of the parameter memory 24 by the operator independent of the domain name storing memory 22. In this case, it is preferred that the operator can store the domain names by the keys and instructions (touching) displayed on the display 31. Further, the frequently used domain names may preferentially be called and displayed on the display 31 by a calling instruction displayed on the display 31, so that a desired one of the displayed domain names is touched to be selected and determined. In this arrangement, frequently used domain names can readily be found and accordingly, the occurrence of erroneous selection of the domain name can be reduced to a large degree. Additionally, the entire address and only the personal identification information contained in the address may be registered (stored) as well as the domain name.

In the case of the internet facsimile machine, when an erroneous address of the addressee has been input as the result of a trifle failure in input of the address, the operator finds out that the address is erroneous only after the image information read by the scanner has been Bent to a relay domain (a commercial provider, for example) on the internet. More specifically, the operator first finds out the failure in input of the address when receiving a message, "Information is untransmissible." from the relay domain. Thereafter, the image information needs to be re-read by the scanner and to be transmitted. This requires much time for the transmission. Further, a fee for communication is charged even when erroneous information has been transferred to the internet. This results in waste of money. These problems are peculiar to the internet facsimile transmission since the information to be transmitted is image information an amount of which is usually large.

Figure 7:
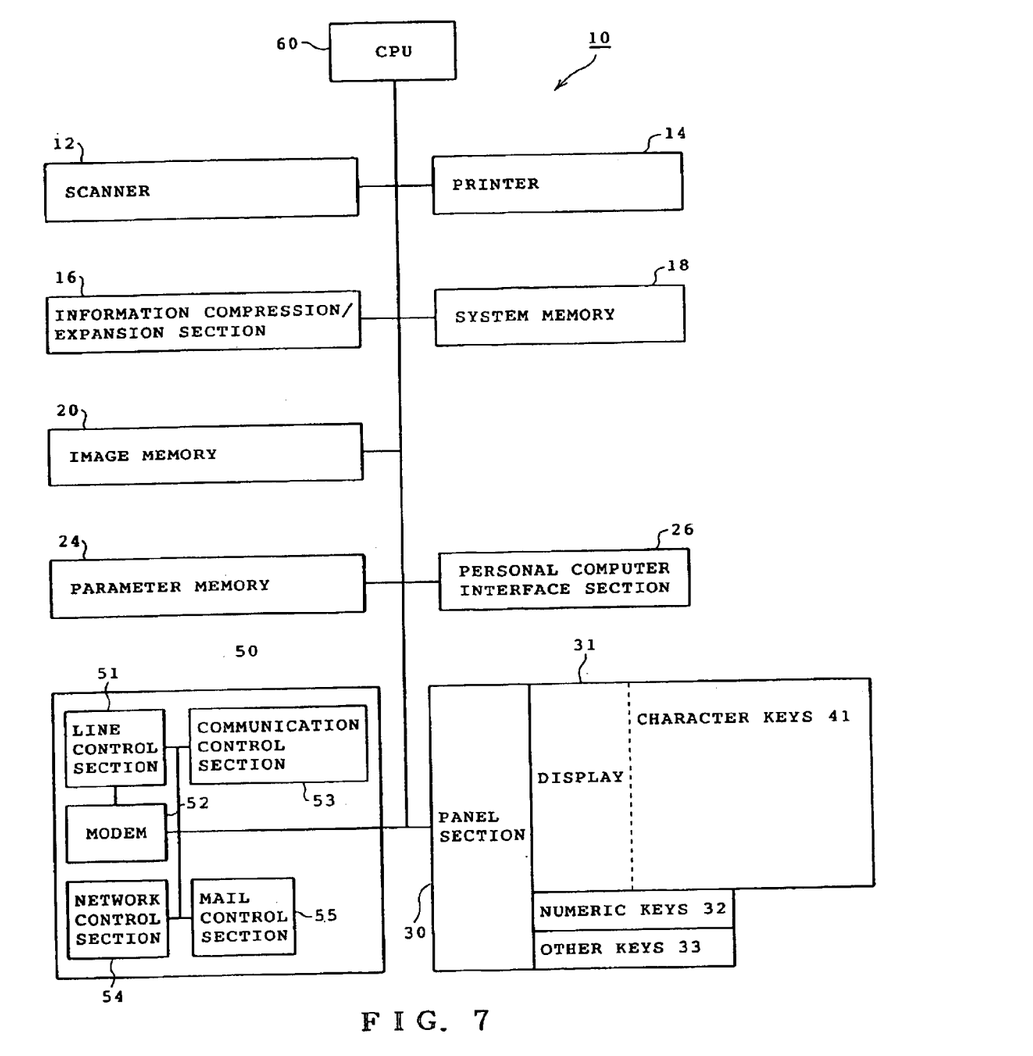
FIG. 7 is a block diagram of an internet facsimile machine of a third embodiment in accordance with the present invention.

A third embodiment of the invention is directed to a solution of the above-described problems. The third embodiment will be described with reference to FIGS. 7 to 9. The identical or similar parts in the third embodiment are labeled by the same reference symbols as in the first embodiment. Referring to FIG. 7, the arrangement of an internet facsimile machine of the third embodiment is schematically shown. The internet facsimile machine 10 comprises the CPU 60, the scanner 12, the printer 14, the information compression/expansion section 16, the system memory 18, the image memory 20, the parameter memory 24, the personal computer interface section 26, the panel section 30, and the communication facility section 50.

The panel section 30 comprises the display 31, the numeric key 32 and other keys 33. The display 31 displays various pieces of information and also displays various types of keyboard screens. When the operator touches the keyboard screen, an item corresponding to the touched part of the screen is input. For example, the character keys 41 are diagrammatically displayed on the display 31. The display 31 and the CPU 60 constitute notification means in the invention.

The communication facility section 50 comprises the line control section 51, the modem 52, the communication control section 53, the network control section 54 and the mail control section 55, as well known in the art. The communication facility section 50 and the CPU 60 constitute inquiry means and inquiry transmission instruction means in the invention.

Figure 8:
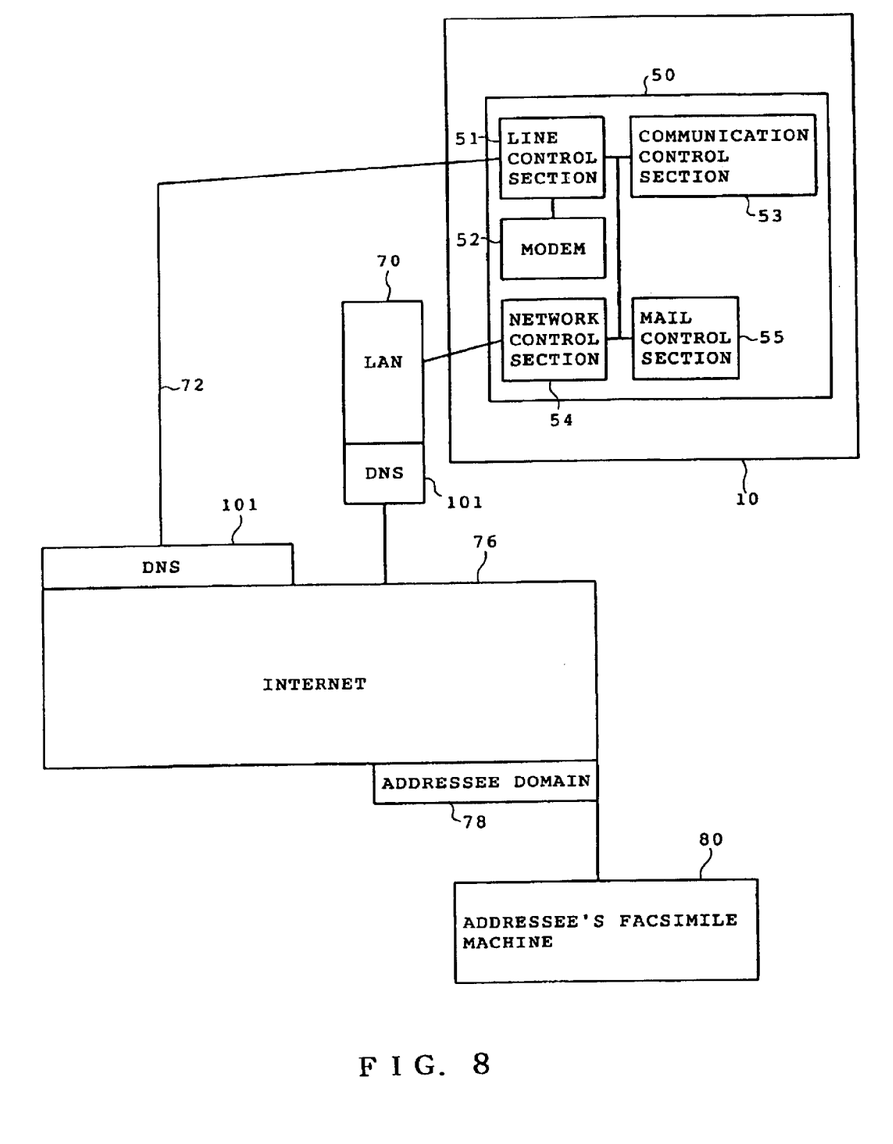
FIG. 8 is a schematic block diagram of the internet facsimile machine and a communication network connected to the internet facsimile machine.

FIG. 8 schematically shows the internet facsimile machine 10 and a communication network connected thereto. The network control section 54 of the communication facility section 50 is connected to a LAN 70 and a domain name server (DNS) 101 in the LAN 70, whereas the line control section 51 of the communication facility section 50 is connected to the public telephone line 72. The telephone line 72 is connected via a DNS 101 of the internet 76, the internet 76 and the addressee domain 78 to the facsimile machine 80 of the addressee. The DNS 101 of the LAN 70 is connected via the internet 76 and the addressee domain 78 to the facsimile machine of the addressee.

Figure 9:
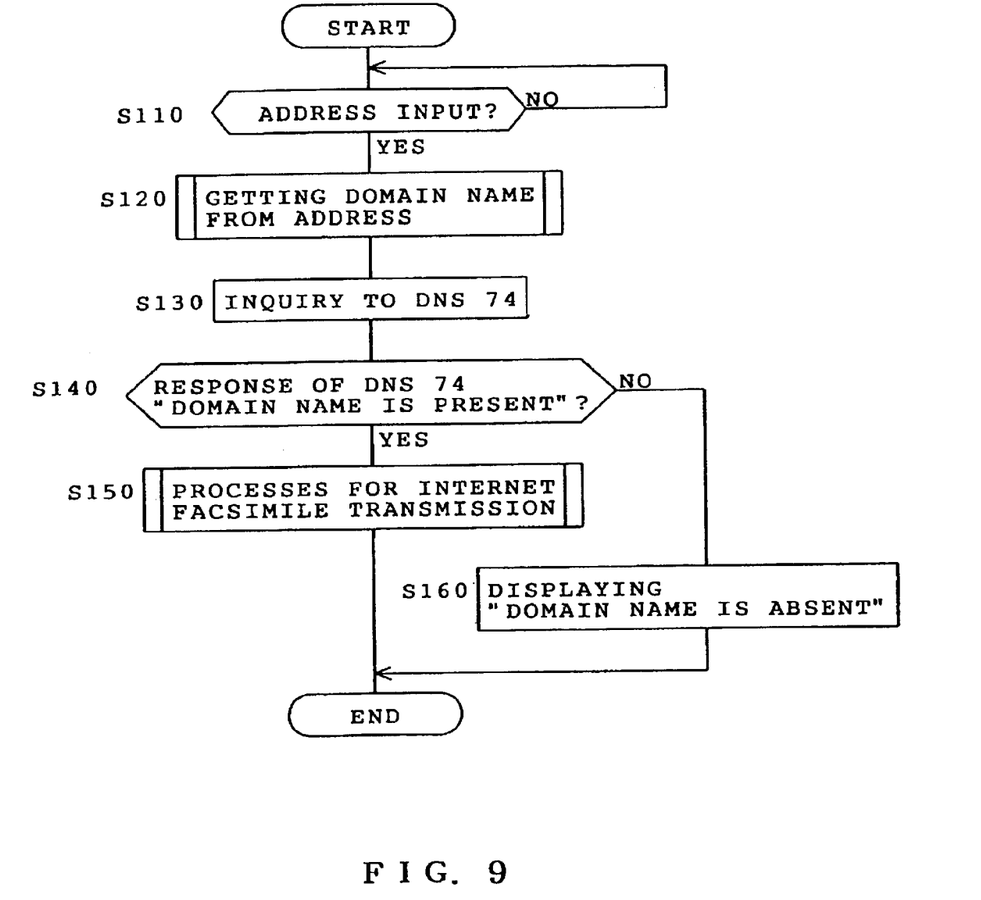
FIG. 9 is a flowchart showing processes for internet facsimile transmission.

Processes for transmission by use of the internet facsimile machine 10 will be described with reference to FIG. 9. After the internet facsimile machine 10 has been connected to either DNS 101, the CPU 60 judges whether data of information necessary for the internet facsimile transmission including an addressee's address has been input with the keys of the panel section 30 (step S110). When the data has not been input yet (NO at step S110), the CPU 60 is on standby for input of the data. On the other hand, when the data has been input (YES at step S110), the CPU 0 obtains a domain name from the address of the addressee (S120).

The CPU 60 then inquires, via the communication control section 53, of the DNS 101 about the presence of the domain name obtained at step S120 according to a protocol (Regulations 882, 683, 1034 and 1035 of Request For Comments (RFC), for example) for the request to the DNS 101 (step S130). The DNS 101 can reply to the request since all the transmissible servers are registered in the DNS 101. When the communication control section 53 receives the reply from the DNS 101, the CPU 60 judges which the reply is, "The corresponding domain is present" or "The corresponding domain is absent" (step S140). When the reply is "The corresponding domain is present" (YES at step S140), the CPU 60 carries out via the communication control section 53 processes for the internet facsimile transmission (step S150). More specifically, data of information to be transmitted is first read by the scanner 12. The read data is then compressed by the information compression/expansion section 16. A format conversion is then carried out for the purpose of transmission of the compressed data of information onto the internet 76. Further, necessary information such as the addressee is added to the information to be transmitted. The data of information is then transmitted via the relay domain with the DNS 101 to the domain 78 of the addressee on the internet 76. In the case of a dial-up connection, the data of information is transmitted via the modem 52, the line control section 51 and the public telephone line 72 to the addressee's facsimile machine 80.

On the other hand, when the reply is "The corresponding domain is absent" (NO at step S140), the CPU 60 displays on the display 3; the message, "The domain name of the address is absent" (step S160), ending the processes for the internet transmission. In this case, the image information to be transmitted is not deliverer! from the internet facsimile machine 10. Viewing the message on the display 31, the operator finds that the domain name of the address has erroneously been input. In this case, the correct domain name is input and the processes at step S110 and subsequent steps are repeated.

According to the third embodiment, the CPU 60 inquires of the DNS 101 as to whether the domain name of the address is present before the data of image information is transferred to the DNS 101. When the domain name is absent, transfer of the data of image information to the relay domain with the DNS 101 is interrupted. Consequently, a useless expenditure including a transmission fee for the transfer of the data to the relay domain can be prevented when the domain name is absent due to the error in input of the domain name and particularly in the case of the dial-up connection to the provider. Accordingly, waste of transmission cost and the charge resulting from the use of the internet can be reduced.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. An internet facsimile machine capable of facsimile transmission via an internet to an addressee, comprising:
    identification information input means for an operator to input user identification information of an address of an addressee, the address including user identification information and information relating to a user;
    attribute presenting means for presenting a plurality of attributes of the information relating to the user before an operator inputs the information relating to the user so that one of the presented attributes is selected so that a number of possible candidates for the information relating to the user is reduced;
    predetermined information input/selection means for inputting or selecting a predetermined piece of information so that the information relating to the user in the address of the addressee is narrowed;
    storage means for storing a large amount of information about the user;
    candidate presenting means for presenting a candidate for the information relating to the user in the address of the addressee by relating the predetermined information input or selected by the input/selection means to the information about the user stored in the storage means;
    presented candidate determining means for determining only one candidate when said one candidate is presented by the candidate presenting means, and for selecting and determining either or any one of two or more candidates when said two or more candidates are presented by the candidate presenting means; and
    transmission instruction means for instructing execution of internet transmission according to an address including the user identification information input by the identification information input means and the information relating to the user determined by the presented candidate determining means.

2. An internet facsimile machine according to claim 1, wherein the information relating to the user includes a name of domain.

3. An internet facsimile machine according to claim 2, wherein:
    the predetermined information input/selection means includes character/numeral input means capable of inputting characters and numerals one by one;
    the character/numeral input means also serves as the predetermined information input/selection means;
    the predetermined information input or selected by the pre determined information input/selection means includes one or more characters or numerals at a predetermined location of the domain name; and
    the candidate presenting means presents a candidate for domain name at a location corresponding to the predetermined location where the same character or numeral as the character or numeral input or selected by the predetermined information input/selection means.

4. An internet facsimile machine according to claim 2, wherein the predetermined information input/selection means selects one or more attributes of the domain name, and the candidate presenting means presents the candidate conforming to said one or more attributes.

5. An internet facsimile machine according to claim 1, further comprising:
    a registration key for registering a candidate for at least any one of the whole address of the addressee, personal identification information of the address, and information in the address relating to the user;
    registration storage means for storing the candidate registered by the registration key;
    calling means for calling any one of the candidates stored in the registration storage means; and
    called candidate determining means, when the candidates called by the calling means includes a desired one, for selecting and determining the desired candidate; and
    wherein the transmission instruction means is capable of instructing execution of transmission with respect to an address which is the candidate determined by the called candidate determining means or an address including the candidate determined by the called candidate determining means.

6. An internet facsimile machine according to claim 2, further comprising:
   a registration key for registering a candidate for at least any one of the whole address of the addressee, personal identification information of the address, and information in the address relating to the user;
   registration storage means for storing the candidate registered by the registration key;
   calling means for calling any one of the candidates stored in the registration storage means; and
   called candidate determining means, when the candidates called by the calling means includes a desired one, for selecting and determining the desired candidate; and
   wherein the transmission instruction means is capable of instructing execution of transmission with respect to an address which is the candidate determined by the called candidate determining means or an address including the candidate determined by the called candidate determining means.

7. An internet facsimile machine according to claim 2, further comprising:
   inquiry means for inquiring of a domain name server on the internet about the presence of a domain name of an addressee's address input by the operator before execution of internet facsimile transmission;
   inquiry transmission instruction means for instructing execution of internet facsimile transmission to the addressee's address including the domain name when informed of presence of the domain name as the result of inquiry by the inquiry means; and
   notification means for notifying the operator of absence of the domain name when informed of absence of the domain name as the result of inquiry by the inquiry means.

8. An internet facsimile machine capable of facsimile transmission via an internet to an addressee, comprising:
   inquiry means for inquiring of a domain name server on the internet about the presence of a domain name of an addressee's address input by an operator before execution of internet facsimile transmission, the address including information relating to a user;
   inquiry transmission instruction means for instructing execution of internet facsimile transmission to the addressee's address including the domain name when informed of presence of the domain name as the result of inquiry by the inquiry means;
   notification means for notifying the operator of absence of the domain name as the result of inquiry by the inquiry means; and
   attribute presenting means for presenting a plurality of attributes of the information relating to the user before an operator inputs the information relating to the user so that one of the presented attributes is selected so that a number of possible candidates for the information relating to the user is reduced.

9. An internet facsimile machine capable of facsimile transmission via an internet to an addressee, comprising:
   an identification information input circuit for an operator to input user identification information of an address of an addressee, the address including user identification information and information relating to a user;
   an attribute presenting circuit for presenting a plurality of attributes of the information relating to the user before an operator inputs the information relating to the user so that one of the presented attributes is selected so that a number of possible candidates for the information relating to the user is reduced;
   a predetermined information input/selection circuit for inputting or selecting a predetermined piece of information so that the information relating to the user in the address of the addressee is narrowed;
   a storage unit for storing a large amount of information about the user;
   a candidate presenting circuit for presenting a candidate for the information relating to the user in the address of the addressee by relating the predetermined information input or selected by the input/selection circuit to the information about the user stored in the storage unit;
   a presented candidate determining circuit for determining only one candidate when said one candidate is presented by the candidate presenting circuit, and for selecting and determining either or any one of two or more candidates when said two or more candidates are presented by the candidate presenting circuit; and
   a transmission instruction circuit for instructing execution of internet transmission according to an address including the user identification information input by the identification information input circuit and the information relating to the user determined by the presented candidate determining circuit.

10. An internet facsimile machine according to claim 9, wherein the information relating to the user includes a name of domain.

11. An internet facsimile machine according to claim 10, wherein:
    the predetermined information input/selection circuit includes a character/numeral input circuit capable of inputting characters and numerals one by one;
    the character/numeral input circuit also serves as the predetermined information input/selection circuit;
    the predetermined information input or selected by the predetermined information input/selection circuit includes one or more characters or numerals at a predetermined location of the domain name; and
    the candidate presenting circuit presents a candidate for domain name at a location corresponding to the predetermined location where the same character or numeral as the character or numeral input or selected by the predetermined information input/selection circuit.

12. An internet facsimile machine according to claim 10, wherein the predetermined information input/selection circuit selects one or more attributes of the domain name, and the candidate presenting circuit presents the candidate conforming to said one or more attributes.

13. An internet facsimile machine according to claim 9, further comprising:
    a registration key for registering a candidate for at least any one of the whole address of the addressee, personal identification information of the address, and information in the address relating to the user;
    a registration storage circuit for storing the candidate registered by the registration key;
    a calling circuit for calling any one of the candidates stored in the registration storage circuit; and
    a called candidate determining circuit, when the candidates called by the calling circuit includes a desired one, for selecting and determining the desired candidate; and wherein the transmission instruction circuit is capable of instructing execution of transmission with respect to an address which is the candidate determined by the called candidate determining circuit or an address including the candidate determined by the called candidate determining circuit.

* * * * *